(12) United States Patent
Daehn et al.

(10) Patent No.: US 12,157,168 B2
(45) Date of Patent: Dec. 3, 2024

(54) ADDITIVE MANUFACTURING USING A MOMENTUM TRANSFER METHOD

(71) Applicant: Ohio State Innovation Foundation, Columbus, OH (US)

(72) Inventors: Glenn Daehn, Columbus, OH (US); Anupam Vivek, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 641 days.

(21) Appl. No.: 17/434,580

(22) PCT Filed: Feb. 27, 2020

(86) PCT No.: PCT/US2020/020082
§ 371 (c)(1),
(2) Date: Aug. 27, 2021

(87) PCT Pub. No.: WO2020/176721
PCT Pub. Date: Sep. 3, 2020

(65) Prior Publication Data
US 2022/0143708 A1  May 12, 2022

Related U.S. Application Data

(60) Provisional application No. 62/811,152, filed on Feb. 27, 2019.

(51) Int. Cl.
*B22F 12/53* (2021.01)
*B22F 10/25* (2021.01)
(Continued)

(52) U.S. Cl.
CPC .............. *B22F 12/53* (2021.01); *B22F 10/25* (2021.01); *B22F 12/43* (2021.01); *B23K 26/34* (2013.01);
(Continued)

(58) Field of Classification Search
None
See application file for complete search history.

(56) References Cited

U.S. PATENT DOCUMENTS 4,842,182 A   6/1989  Szecket
8,084,710 B2  12/2011 Daehn et al.
(Continued)

FOREIGN PATENT DOCUMENTS

CN   101234428 A   8/2008
CN   103272907 A   9/2013
(Continued)

OTHER PUBLICATIONS

Machine translation of CN-105903962-B, Aug. 2024 (Year: 2024).*
(Continued)

*Primary Examiner* — Geoffrey S Evans
(74) *Attorney, Agent, or Firm* — Meunier Carlin & Curfman LLC

(57) ABSTRACT

A metallic product is produced by an additive manufacturing method. A device for practicing has a controller with a stored instruction set for implementing the manufacturing of the metallic product. The metallic product is manufactured in a piece-wise or layer-wise manner on a target platform by a print head that is in two-way communication with the controller. The print head operates on a momentum transfer technique in which pulsed energy from an impulse source is used to launch pieces of metal toward the target platform, the pieces of metal bonding at the target platform to manufacture the metallic product.

7 Claims, 2 Drawing Sheets

(51) Int. Cl.

| | |
|---|---|
| *B22F 12/43* | (2021.01) |
| *B23K 26/34* | (2014.01) |
| *B23K 26/356* | (2014.01) |
| *B33Y 10/00* | (2015.01) |
| *B33Y 30/00* | (2015.01) |
| *B22F 10/85* | (2021.01) |
| *B33Y 50/02* | (2015.01) |

(52) U.S. Cl.
CPC ............ *B23K 26/356* (2015.10); *B33Y 10/00* (2014.12); *B33Y 30/00* (2014.12); *B22F 10/85* (2021.01); *B33Y 50/02* (2014.12)

(56) References Cited

U.S. PATENT DOCUMENTS

| | | | |
|---|---|---|---|
| 9,021,845 B2 | 5/2015 | Vivek | |
| 10,315,218 B2 | 6/2019 | Mahalingam et al. | |
| 10,889,068 B1 * | 1/2021 | Batchelder | B33Y 30/00 |
| 2009/0278891 A1 | 11/2009 | Silverbrook | |
| 2014/0178593 A1 | 6/2014 | Ren et al. | |
| 2015/0021379 A1 | 1/2015 | Albrecht et al. | |
| 2016/0106142 A1 | 4/2016 | Contractor et al. | |
| 2016/0300031 A1 | 10/2016 | Salwan | |
| 2017/0087666 A1 | 3/2017 | Sasaki et al. | |
| 2017/0232550 A1 * | 8/2017 | Bruck | B23K 20/06 219/76.12 |
| 2017/0259501 A1 * | 9/2017 | Gandhiraman | B22F 10/50 |
| 2017/0368822 A1 | 12/2017 | Guillemot | |
| 2018/0090314 A1 * | 3/2018 | Kotler | H01L 21/683 |
| 2018/0186095 A1 * | 7/2018 | Yang | B29C 64/386 |
| 2018/0281125 A1 * | 10/2018 | Burbaum | B23K 35/3033 |
| 2019/0009300 A1 | 1/2019 | Mahalingam et al. | |

FOREIGN PATENT DOCUMENTS

| | | | |
|---|---|---|---|
| CN | 103273194 A | 9/2013 | |
| CN | 105903962 B * | 7/2018 | ............ B22F 3/1055 |
| DE | 102012018286 A1 | 3/2014 | |
| EP | 3022004 A1 | 5/2016 | |
| WO | WO-2016116924 A1 * | 7/2016 | ............. B22F 10/20 |
| WO | 2016151713 A1 | 9/2016 | |
| WO | WO-2017085712 A1 * | 5/2017 | ............... B22C 9/00 |

OTHER PUBLICATIONS

International Search Report and Written Opinion, issued by the International Searching Authority (ISA/US) in PCT Application No. PCT/US2020/020082 on Jul. 31, 2020. 12 pages.

Gupta, Varun, et al. "A robust process-structure model for predicting the joint interface structure in impact welding." Journal of Materials Processing Technology 264 (Feb. 1, 2019): 107-118.

Wang, Huimin, et al. "Laser impact welding application in joining aluminum to titanium." Journal of Laser Applications 28.3 (Aug. 13, 2016): 032002.

Mln Booklet, "Evaluation and Management Services Guide", 2021, 23 pages, publication date: Feb. 2021.

Office Action issued for Japanese Application No. 2021550076, dated Feb. 6, 2024.

Chinese National Intellectual Property Administration. Office Action issued in Chinese Application No. 202080030393.4 on Jun. 9, 2023. 7 pages.

European Patent Office. Extended European Search Reporting. Issued in EP Application No. 20763138.3. Dec. 12, 2022. 9 pages.

Jodoin et al. (2007). Pulsed-Gas Dynamic Spraying: Process analysis, development and selected coating examples. Surface and Coatings Technology, 201(16-17), 7544-7551, Publication date Feb. 2007.

Guo et al. (2022). Cold spray: Over 30 years of development toward a hot future. Journal of Thermal Spray Technology, 31(4), 866-907, Publication date May 2022.

* cited by examiner

ADDITIVE MANUFACTURING USING A MOMENTUM TRANSFER METHOD

CROSS-REFERENCE TO RELATED APPLICATIONS

This application is a United States National Phase Patent Application filed under 35 U.S.C. § 371 of International Patent Application Number PCT/US2020/020082, filed on Feb. 27, 2020, which claims the benefit of priority to U.S. Provisional Application No. 62/811,152, filed Feb. 27, 2019, the contents of which are incorporated by reference herein in their entirety.

TECHNICAL FIELD

The disclosed embodiments relate to methods of additive manufacturing that are based on using momentum transfer techniques to bond metal pieces in a layer-by-layer manner. Such techniques allow for precise placement while not having the disruptions of microstructure inherent with heat input.

BACKGROUND OF THE ART

Additive manufacturing builds up a product by piece-wise or layer-wise placement of a predetermined material, based upon the control of a print head of a three-dimensional printer by a set of instructions to a controller that are based upon a three-dimensional model of the product. In one known manner, a length of wire is selectively melted onto the piece being built, using a source such as an electron beam. This technique is known as such as processor piece, one known manner of layer-by-layer buildup of metal involves applying a melted at a print head metal as a heated wire at the point of build. Another is the so-called "cold spray" technique in which micron-sized particles impact a surface at high velocity. One example of the cold spray technique is U.S. Pat. No. 10,315,218. One known limitation of cold spray is that it is conventionally used as a coating technique and not as a manner of building a part to a near-net shape. Another additive manufacturing technique known in the art is a sintered metal technique using a powdered metal.

It is therefore an unmet advantage of the prior art to provide additive manufacturing methods which employ momentum transfer techniques.

SUMMARY OF THE INVENTION

This and other unmet advantages are provided by the devices and methods described and shown in more detail below.

In some embodiments, the device for additive manufacturing of a metallic product comprises controller having an instruction set for implementing the manufacturing of the metallic product stored therein, a target platform on which the metallic product is manufactured in a piece-wise or layer-wise manner, and a print head that is in two-way communication with the controller. The device is characterized in that the print head receives pulsed energy from an impulse source to launch pieces of metal toward the target platform using a momentum transfer technique, the pieces of metal bonding at the target platform to manufacture the metallic product.

In some of the embodiments, the momentum transfer technique is laser impact welding. In such a case, the print head comprises a backing plate with an aperture of a predetermined area and shape and a web of flyer metal having a predetermined thickness and composition, positioned between the backing plate and the impulse source, such that the pulsed energy accelerates a piece of the flyer metal through the aperture, launching the piece of flyer metal toward the target platform.

In some embodiments, the instruction set implements a three-dimensional model of the metallic product by sequentially launching pieces of the flyer metal having a predetermined mass toward a predetermined position of the target platform, using pulsed energy of a predetermined amount from the impulse source. In some of these embodiments, the metallic product is a body built of the flyer metal on the target platform.

In some embodiments, the flyer metal pieces fill cracks or crevices in a preexisting metallic body to produce the metallic product.

In some embodiments, the flyer metal pieces add features to a preexisting metallic body to produce the metallic product.

In other embodiments, the flyer metal pieces create a homogeneous weld or a heterogeneous weld of two or more preexisting pieces.

In yet further embodiments, the flyer metal pieces provide a surface coating to a preexisting metal body.

The method for additive manufacturing of a metallic product, comprising the steps of:

obtaining a three-dimensional model of the metallic product and a set of instructions to implement the three-dimensional model using a print head;

providing the set of instructions to a controller in operational control of at least the print head and an impulse source;

transmitting, from the controller to the print head and the impulse source, the set of instructions in a sequential manner, wherein each instruction in the set directs the impulse source to direct a predetermined pulse of energy towards a web of a flyer metal atop a backing plate having an aperture therein, so that a piece of the flyer metal is sheared off of the web and is launched toward a predetermined position of the target platform, at a speed sufficient to bond the launched piece onto the metallic product being constructed according to the three-dimensional model on the target platform; and repeating the transmitting step until an end of the set of instructions is reached, resulting in the metallic product.

BRIEF DESCRIPTION OF THE DRAWINGS

A better understanding of the disclosed embodiments will be obtained from the appended drawings, in which identical parts are identified with identical reference numbers and in which.

DETAILED DESCRIPTION OF A PREFERRED EMBODIMENT

Small chunks of metal can bond to one another, provided that they are progressively added together with appropriate impact speed and angle. This can be used to build a body in a near-net shape, or fill cracks, add features, create homogeneous or heterogeneous welds, or provide surface coatings.

The methods and devices of the present application use particles of significantly larger size. The interfaces and porosity resulting from Cold Spray technology give poor properties. In the concepts presented here, solid-state welding is effected by metal units that are millimeters or centimeters in dimension. This can give much higher deposition rates and much better mechanical properties for the deposit.

There are multiple methods that can be used to accelerate a flyer plug to the target to provide a momentum transfer effect. Three of these are of particular note.

The first method is Ablative Laser Launch. The general concepts of this method are described in U.S. Pat. No. 8,084,710 of Daehn (inventor herein) and Lippold. Modifications of this method can be adapted to the high throughput applications that are needed for additive manufacturing.

The second method is Vaporizing Foil Actuator. The general concepts of this method are described in U.S. Pat. No. 9,021,845 of Vivek (inventor herein). This method can be used with automated feed for high productivity launch of successive slugs at high speed and appropriate contact angles.

The third method is a Traditional Ballistic Gun. This device can be used to reach the required impact speed, typically over 500 m/s, and, as long as the gun can be arranged with respect to the target surface to give an appropriate impact angle, which is usually about 20°, successive impact welding can be achieved.

It is believed that there are several potentially patentable concepts provided. These include building up, repairing, shaping or joining bodies using a series of flyer bodies. They also include applying this concept to the making of shapes. It is believed that this can be applied to cold or in-field repairs. It also involves the use of long (i.e., 50-500 ns) high intensity (i.e., ~10 $GW/cm^2$) laser impulses.

Figure 1:
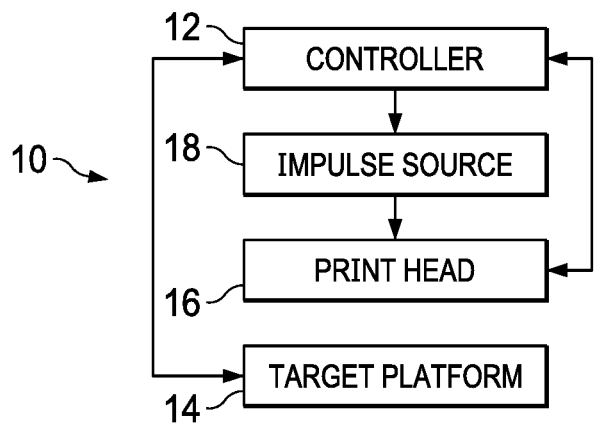
FIG. 1 is a schematic depiction of an additive manufacturing device.

Turning now to the figures, FIG. 1 shows a schematic depiction of an additive manufacturing device 10. In additive manufacturing, a three-dimensional model is obtained for a product to be constructed. This model is converted into a set of instructions that can be stored in a dedicated controller 12 or which can be transmitted to the controller by a general-purpose computer. The controller 12 is associated with a platform 14 on which the product will be built and a print head 16 which is used to implement the instructions from the instruction set. Accordingly, the print head 16 is in at least unidirectional communication with the controller 12 to receive the instructions and is preferably in bi-directional communication, especially for sending information about the position and orientation of the print head relative to the target platform 14.

In the instance of an additive manufacturing device 10 that uses momentum transfer to energize the operation of the print head 16, as is being described here, it is also necessary to have an impulse source 18, especially one that is in communication with the controller 12 to receive instructions and to advise the controller as to its operational condition.

Figure 2:
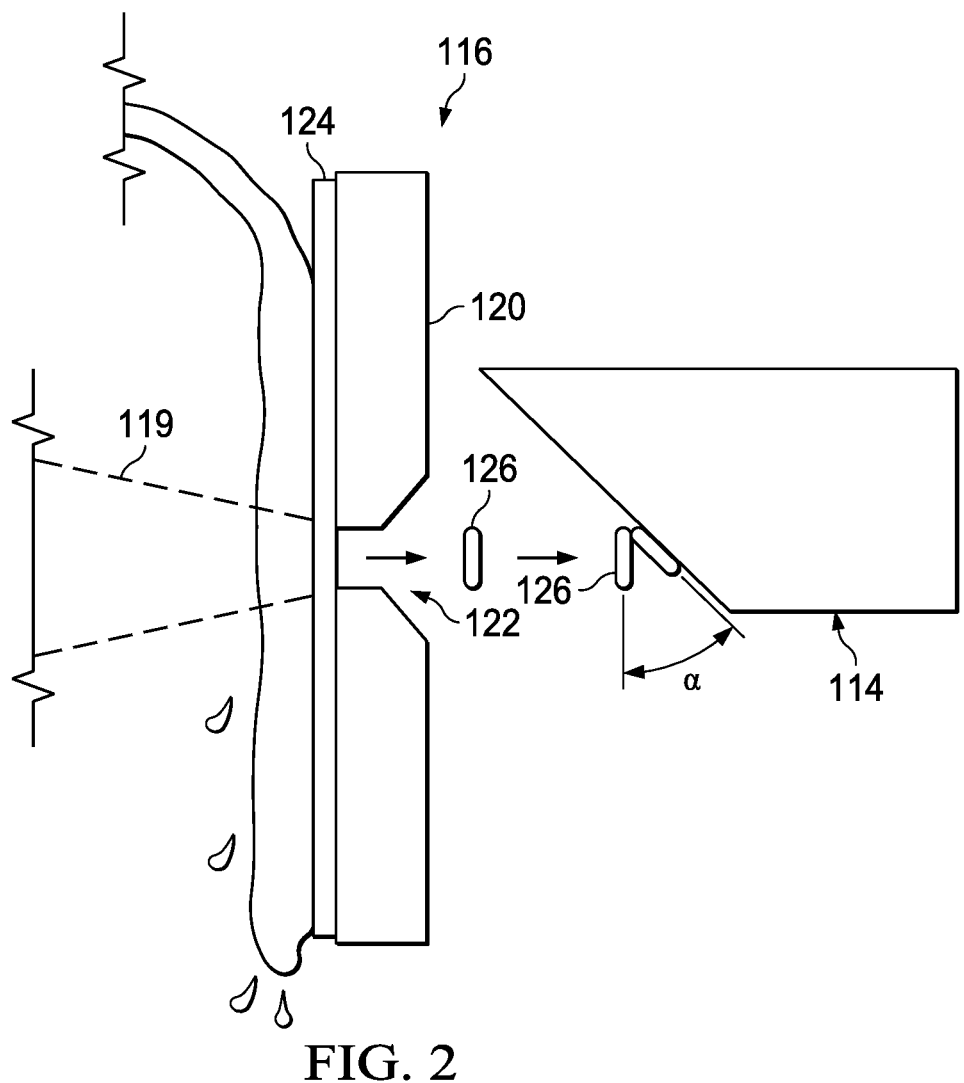
FIG. 2 is a schematic depiction of a first embodiment of a print head and target for an additive manufacturing device.

Directing attention to FIG. 2, a first embodiment 116 of the print head in combination with a first embodiment 114 of the target platform is depicted in a schematic manner. In this case, the print head 116 has a backing plate 120 with an aperture 122. While shown in side view, it is understood that this aperture 122 could be configured in several different shapes, including circular, square, rectangular, etc. The backing plate 120 is positioned between the target platform 114 and a web 124 of flyer metal. When a laser impulse 119 that originates in the impulse source strikes the web 124 of flyer metal, the impact of the laser impulse, which is directed at the aperture 122, accelerates the flyer metal. Flyer metal in the web 124 that is positioned over the aperture 122 is not restrained, resulting in it being sheared off of the web and accelerated towards the target platform 114. These sheared pieces 126 of flyer metal impact the target platform at an angle α and at a velocity sufficient to cause bonding. Because the thickness of the web of flyer metal is known and because the area and shape of the aperture 122 may be varied by selecting the backing plate, the volume and three-dimensional profile of the sheared pieces 126 may be predetermined. By changing the composition of the web of flyer metal, the material and density of the sheared pieces 126 may be predetermined. The power and duration of the laser impulse 119 may also be predetermined.

This technology may be used to fill cracks or crevices in the metal used as the target, and it may also be used to impart a surface coating to the target or to build up a feature on the surface of the target. The difference in these techniques is merely one of differences in the three-dimensional model being used in the controller.

Figure 3:
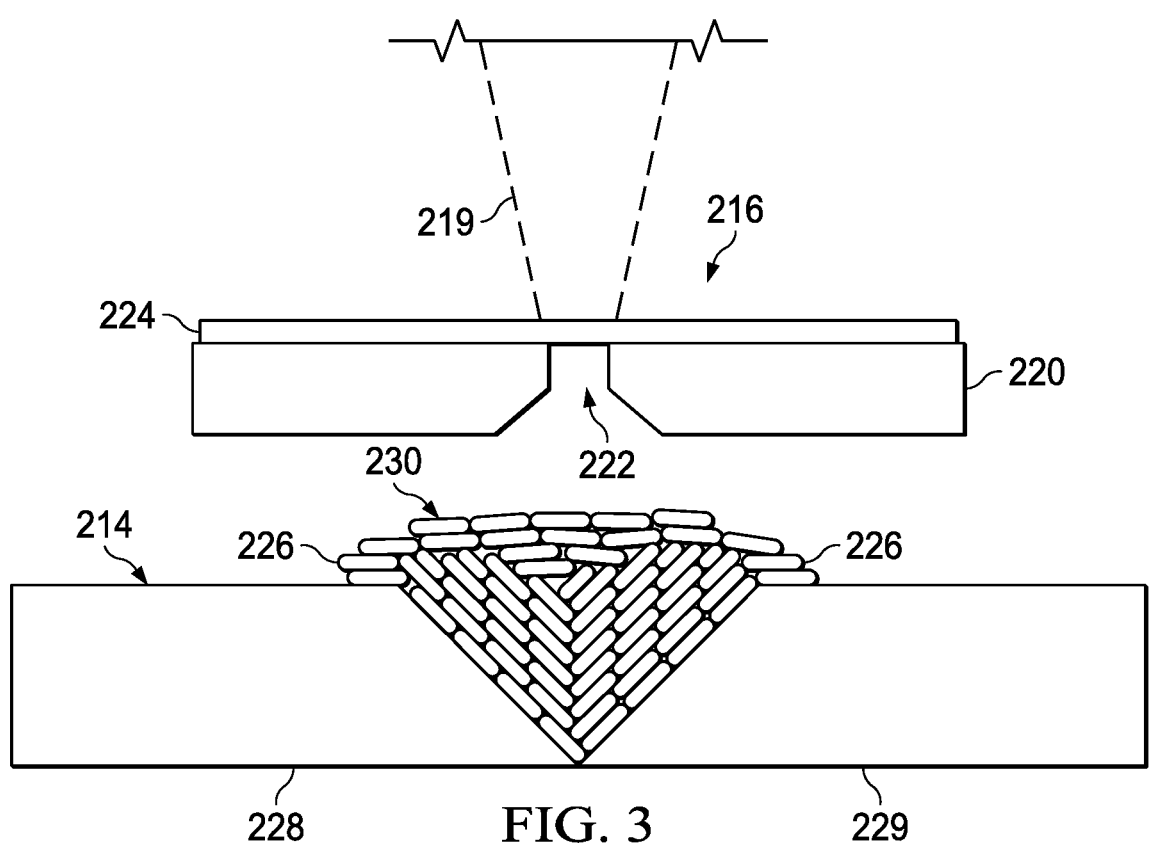
FIG. 3 is a schematic depiction of a second embodiment of a print head and target for an additive manufacturing device.

Directing attention to FIG. 3, a second embodiment 216 of the print head in combination with a second embodiment 214 of the target platform is depicted in a schematic manner. In this case, the print head 216 has a backing plate 220 with an aperture 222. While shown in side view, it is understood that this aperture 222 could be configured in several different shapes, including circular, square, rectangular, etc. The backing plate 220 is positioned between the target platform 214 and a web 224 of flyer metal. When a laser impulse 219 that originates in the impulse source strikes the web 224 of flyer metal, the impact of the laser impulse, which is directed at the aperture 222, accelerates the flyer metal. Flyer metal in the web 224 that is positioned over the aperture 222 is not restrained, resulting in it being sheared off of the web and accelerated towards the target platform 214. In this situation, the target platform 214 has two pieces 228, 229 of metal that are to be joined. These sheared pieces 226 of flyer metal impact the pieces 228, 229 or sheared pieces that have previously been impacted into a fill zone 230. The collision of the sheared pieces 226 transfers momentum at velocity sufficient to cause bonding. Because the thickness of the web 224 of flyer metal is known and because the area and shape of the aperture 222 may be varied by selecting the backing plate, the volume and three-dimensional profile of the sheared pieces 226 may be predetermined. By changing the cornposition of the web of flyer metal, the material and density of the sheared pieces 226 may be predetermined. The power and duration of the laser impulse 219 may also be predetermined. It will be recognized that pieces 228, 229 may be of the same or of different metals or compositions and that the fill zone 230 may comprise even a different metal.

What is claimed is:

1. A device for additive manufacturing of a metallic product, comprising a controller having an instruction set for implementing the manufacturing of the metallic product stored therein; a target platform on which the metallic product is manufactured in a piece-wise or layer-wise manner; and a print head that is in two-way communication with the controller, such that:

the print head receives pulsed energy from an impulse source to launch pieces of metal toward the target platform using a momentum transfer technique, such that the pieces of metal bond at the target platform to manufacture the metallic product;

wherein the momentum transfer technique is a laser impact welding; and wherein the print head comprises a backing plate with an aperture of a predetermined area and shape and a web of a flyer metal having a predetermined thickness and composition, wherein the web of the flyer metal is positioned between the backing plate and the impulse source, such that the pulsed energy accelerates a piece of the flyer metal through the aperture, launching the piece of the flyer metal toward the target platform.

2. The device of claim 1, wherein the instruction set implements a three-dimensional model of the metallic product by sequentially launching pieces of the flyer metal having a predetermined mass toward a predetermined position of the target platform, using pulsed energy of a predetermined amount from the impulse source.

3. The device of claim 2, wherein the metallic product is a body built of the flyer metal on the target platform.

4. The device of claim 2, wherein the flyer metal pieces fill cracks or crevices in a preexisting metallic body to produce the metallic product.

5. The device of claim 2, wherein the flyer metal pieces add features to a preexisting metallic body to produce the metallic product.

6. The device of claim 2, wherein the flyer metal pieces create a homogeneous weld or a heterogeneous weld of two or more preexisting pieces.

7. The device of claim 2, wherein the flyer metal pieces provide a surface coating to a preexisting metal body.

* * * * *